Patented Oct. 8, 1940

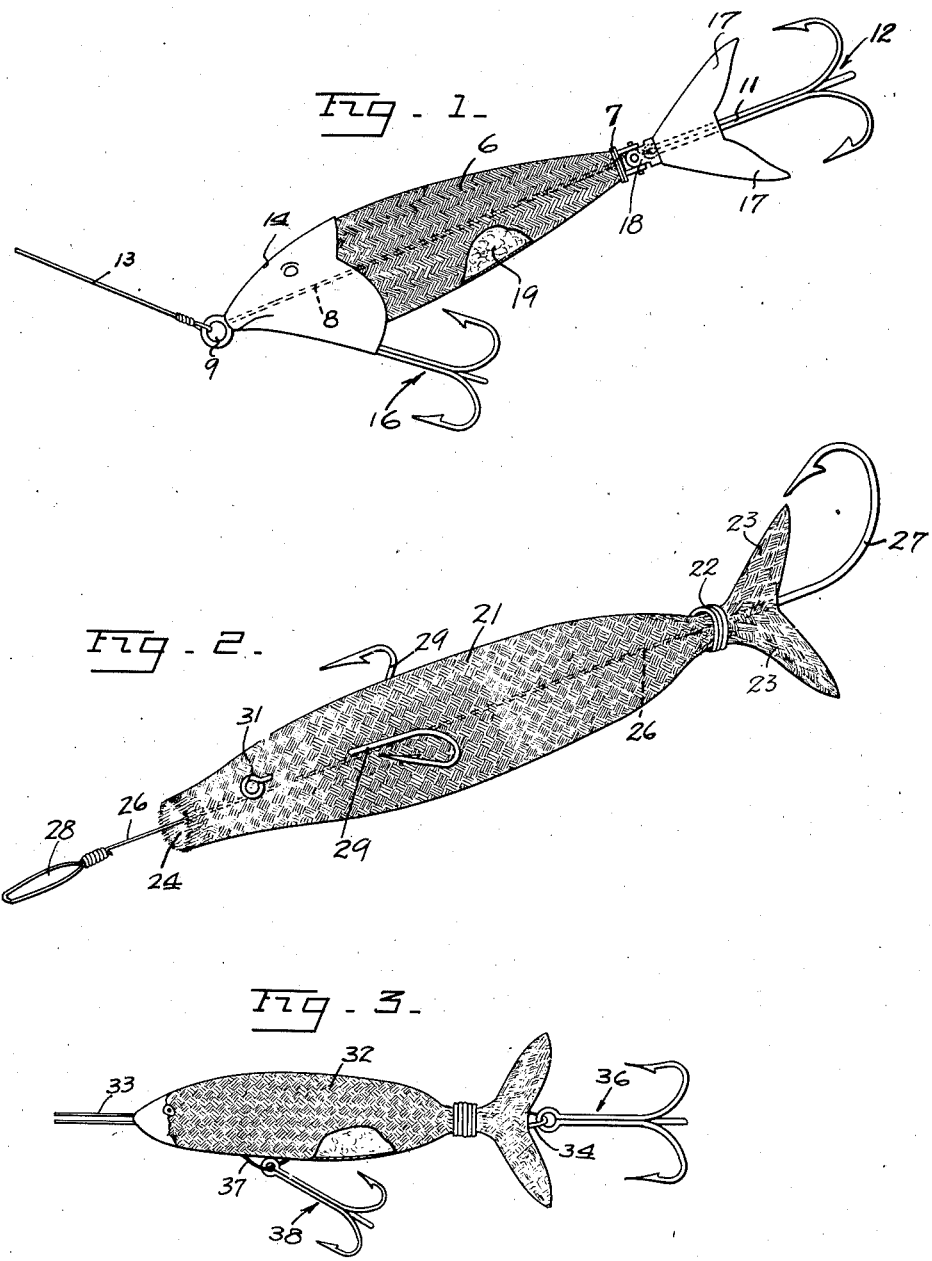

2,216,929

UNITED STATES PATENT OFFICE 2,216,929

FISHING LURE

Louis Jefferson Zander, San Rafael, and John E. Zander, San Anselmo, Calif.

Application October 24, 1936, Serial No. 107,418

2 Claims. (Cl. 43—46)

This invention relates to a fishing lure.

In fishing for larger fish, both in bait fishing and trolling fishermen experienced the hardship in providing a bait so as to prevent smaller fish or crab from nibbling the bait off the hooks. Furthermore by the time the usual bait is placed on the hook it loses its fishlike appearance and is a lifeless mass of flesh, therefore separate lures of many kinds are used which however do not simulate truly the movement of small fish in water. So-called plugs and darts combined with the bait were and are also tried but only with moderate success.

We eliminate the disadvantages of natural or artificial bait and lure heretofore used by providing a lure which completely simulates the movement of smaller fish through the water.

An object of the invention is to provide a simple and economical fishing lure which is adapted for use for trolling or casting especially for larger fish, such as bass; and which completely simulates the movement of the natural live bait in the form of small fish such as sardines.

Another object of the invention is to provide a fishing lure in the form of a small fish, which is preferably made of woven metallic fabric so as to be flexible and allow free circulation of water therethrough and which is sufficiently strong to prevent its being nibbled, destroyed, or carried away in pieces by crabs or smaller fish.

Another object of this invention is to provide a fish lure which is highly useful and simple in construction. Convenience of arrangement, lightness and comparative inexpense of manufacture are further objects which have been borne in mind in the production and development of the invention.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawing.

With the foregoing and other objects in view, which will be made manifest in the following detailed description and specifically pointed out in the appended claims, reference is had to the invention, wherein:

Figure 1 is a perspective view of a fishing lure constructed in accordance with our invention.

Figure 2 is a perspective view of another form of a fishing lure constructed in accordance with our invention, and Figure 3 is a perspective view of another embodiment of our invention.

In carrying out our invention we make use of a hollow, flexible body 6, which is honeycombed with minute perforations or holes. Preferably the body 6 is made of a single piece of woven metallic fabric conduit, which is flexible yet strong. The space between the strands of the fabric provide a large number of apertures. The body 6 is formed in the shape of a small fish. Such metal fabric conduits are usually made in longer sections and can be readily cut in shorter pieces. By twisting and winding a wire or cord 7 around the body 6 a narrower end of the fish shape is formed and a tail can be provided beyond the narrow end.

Through the hollow body 6 extends from end to end a so called leader 8 made of strong cord or wire, the forward end of which is provided with a loop 9. To the tail end of the leader 8 is secured the stem 11 of a multiple hook 12 of the usual type. A usual fishing line 13 is suitably connected to the loop 9.

In the form shown in Figure 1 the head 14 of the fish is formed by a heavy piece of material, such as metal welded to the leading end of the body 6. This head 14 also forms a sinker and obviates the necessity for a separate sinker, and it also directs the fish lure downwardly toward the head and creates a better imitation of a small fish swimming. From one side of the head 14 extends a hook 16 rearwardly and at an angle to the body 6. The fixing of the hook 16 in its position prevents its tangling with the body 6.

At the tail end of the body 6 are tail fins 17 around the stem 11 of the hook 12. These tail fins in Figure 1, are made from a pliable material, such as thin lead or tin, and are connected to the body 6 by means of a suitable universal joint 18. The tail fins 17 can be bent to various angles so as to direct the darting or wiggling of the lure in water. Water is allowed to pass through the spaces between the strands of the metal fabric in and out of the hollow body 6. If desired the body 6 may be stuffed with absorbent stuffing 19, such as cork, or cotton, or a sheet of cork and fibrous stuffing on each side of the cork, and before use the same may be dipped in fish oil or the like to complete the simulation of small fish.

In the form shown in Figure 2, a tubular conduit made of woven metal is formed in the shape of a fish and constitutes a single piece body 21 of the lure. Near the tail end the body 21 is narrowed by a ring 22 formed of wire or cord wound around the body. The portion of the body behind the ring 22 is spread out and flattened into the shape of tail fins 23. The end of the body 21 at the head is open and forms a large mouth 24. A strong leader 26 extends through the entire hollow body 21 and has a tail hook 27 secured thereon. The leading end of the leader has a loop 28 thereon for suitable attachment to a usual fishing line. On each side of the body 21 is a side hook 29. Each side hook 29 has an enlarged head 31 in the form of an eye. Each hook 29 is worked through between the strands of the metal fabric so as to extend rearwardly. The heads 31 of the side hooks 29 are of a darker or different color than that of the metal fabric so as to simulate the eyes of a small fish. The water freely enters through the mouth 24 and out through sides of the lure. Natural, fresh bait, or an absorbent stuffing may be stuffed into the body 21 and be fully protected from small fish.

In the form shown in Figure 3, the metal body 32 is similarly shaped and stuffed and it is closed at the head and tail. The head 35 thereof is formed preferably of metal heavier than the body to be utilized also as a sinker, and is welded, soldered, or otherwise united with said body 32. A double wire leader 33 extends through the entire body 32 and in the loop turn 34 of said leader 33 is swivelably held a hook 36. One of the lines of said leader 33 is extended through the fabric at one side as indicated at 37 and another hook 38 is swivelably suspended thereon. The leading ends of the leader 33 are suitably connected to a fishing line. The stuffing 39 in the body 32 is soft and flexible and is, if desired, absorbent material. A wire or cord 41 is wound and tied around the body 32 near its tail to form a tapering reduced portion thereat.

In the fishing lure heretofore described the metallic conduit with its interwoven strands has a sheen which very closely resembles the sheen of a small fish under water. Through the interstices between the strands of the metal fabric water can flow in and out of the interior of the lure. In addition to the tail fins other fins may be formed on the lure if desired. The fins direct the diving and darting motion of the lure. The hooks on this lure do not get tangled with the body of the lure. Usually the leader is connected to the fishing line by a swivel connection so that the lure is free to wiggle and dart in a very lifelike manner when moved by tide or water currents. If fresh bait is stuffed into the lure, as well as soaked absorbent stuffing, it is fully protected from smaller fish or crabs or the like. The fish lure herein described is easy to handle and has been proven very efficient lure for larger fish such as bass both in casting and trolling.

Having thus described our invention what we claim and desire to secure by Letters Patent is:

1. A fishing lure comprising a tubular body made of flexible, woven metallic fabric, means to hold the body contracted at one end, pliant tail fins formed from said fabric at said end, soft stuffing in said body to maintain it in the shape of a fish, a heavy head integrally formed in the other end of the tubular body, means to hold hooks on the lure, and connecting means between the lure and a fishing line.

2. A fishing lure comprising a tubular body made of flexible woven metallic fabric, means to hold the body contracted at one end, pliant tail fins formed from said fabric at said end, soft stuffing in said body to maintain it in the shape of a fish, a heavy head integrally formed in the other end of the tubular body, a line extended longitudinally through said tubular body and doubled upon itself at the tail end of said body so as to form a double line, an intermediate portion of one branch of said double line being looped outwardly through a side of said body, and hooks mounted in the doubled end and in the side looped portion of said line.

L. JEFFERSON ZANDER.
JOHN E. ZANDER.